United States Patent
Heibel et al.

(10) Patent No.: US 11,094,423 B2
(45) Date of Patent: Aug. 17, 2021

(54) NUCLEAR FUEL FAILURE PROTECTION METHOD

(71) Applicant: Westinghouse Electric Company LLC, Cranberry Township, PA (US)

(72) Inventors: Michael D. Heibel, Harrison City, PA (US); Jorge V. Carvajal, Irwin, PA (US); Shawn C. Stafford, Scottdale, PA (US); Jeffrey L. Arndt, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 15 days.

(21) Appl. No.: 16/264,815

(22) Filed: Feb. 1, 2019

(65) Prior Publication Data

US 2020/0027599 A1    Jan. 23, 2020

Related U.S. Application Data

(60) Provisional application No. 62/625,393, filed on Feb. 2, 2018.

(51) Int. Cl.
*G21C 17/112* (2006.01)
*G21C 17/022* (2006.01)
*G21C 17/032* (2006.01)

(52) U.S. Cl.
CPC .......... *G21C 17/112* (2013.01); *G21C 17/022* (2013.01); *G21C 17/032* (2013.01)

(58) Field of Classification Search
CPC ... G21C 17/112; G21C 17/022; G21C 17/032
USPC ....................................................... 376/247
See application file for complete search history.

(56) References Cited

U.S. PATENT DOCUMENTS

| | | | |
|---|---|---|---|
| 4,045,282 A * | 8/1977 | Barbier | G21C 17/112 376/247 |
| 4,943,683 A | 7/1990 | Utsunomiya et al. | |
| 5,745,538 A | 4/1998 | Heibel | |
| 2010/0128832 A1 | 5/2010 | Yamasaki et al. | |
| 2011/0264426 A1 | 10/2011 | Zhang | |
| 2018/0218797 A1 | 8/2018 | Petrosky | |

FOREIGN PATENT DOCUMENTS

| | | |
|---|---|---|
| JP | 2004279338 A | 10/2004 |
| JP | 2013140150 A | 7/2013 |
| JP | 2015190807 A | 11/2015 |

OTHER PUBLICATIONS

Korean Patent Office, "International Search Report and Written Opinion" for corresponding PCT/US2019/016233, 9 pp., dated Sep. 20, 2019.

* cited by examiner

*Primary Examiner* — Jack W Keith
*Assistant Examiner* — Daniel Wasil
(74) *Attorney, Agent, or Firm* — K&L Gates LLP

(57) ABSTRACT

A method that provides a more direct indication of peak fuel rod centerline temperature and peak fuel rod clad temperature than conventionally inferred from the power distribution by directly and continuously measuring the fuel temperatures of the fuel pellets in one or more of the hottest fuel elements in the core. The peak fuel rod clad temperature is then obtained from the maximum measured peak fuel rod centerline temperature in combination with the maximum coolant core exit temperature and the minimum coolant flow rate.

26 Claims, 4 Drawing Sheets

NUCLEAR FUEL FAILURE PROTECTION METHOD

CROSS-REFERENCE TO RELATED APPLICATION

This application claims priority from and claims the benefit of U.S. Provisional Application Ser. No. 62/625,393, filed Feb. 2, 2018, and entitled "NUCLEAR FUEL FAILURE PROTECTION METHOD."

BACKGROUND

1. Field

This invention pertains generally to a method of determining reactor core operating parameters and, more particularly, to a method of more accurately monitoring the peak fuel rod centerline temperature and determining the fuel rod peak clad temperature and the closeness to critical operating limits for those parameters.

2. Related Art

In many state-of-the-art nuclear reactor systems in-core sensors are employed for directly measuring the radioactivity within the core at a number of axial elevations. Thermocouple sensors are also located at various points around the core at an elevation where the coolant exits the core to provide a direct measure of coolant outlet temperature at various radial locations. These sensors are used to directly measure the radial and axial distribution of power inside the reactor core. This power distribution measurement information is used to determine whether the reactor is operating within nuclear power distribution limits. The typical in-core sensor used to perform this function is a self-powered detector that produces an electric current that is proportional to the amount of fission occurring around it. This type of sensor is generally disposed within an instrument thimble within various fuel assemblies around the core, does not require an outside source of electrical power to produce the current, is commonly referred to as a self-powered detector and is more fully described in U.S. Pat. No. 5,745,538, which is incorporated in its entirety herein by reference.

Another type of sensor capable of measuring various parameters of the core, which is typically disposed within the instrument thimbles in various fuel assemblies around the core is described in U.S. Patent Application Publication No. 2018/0218797, which is incorporated in its entirety herein by reference. This type of sensor employs a transmitter device that includes a self-powered neutron detector structured to detect neutron flux, a capacitor electrically connected in parallel with the neutron detector, a gas discharge tube having an input end and an output end, and an antenna electrically connected to the output end in series with a resonant circuit. The input end of the gas discharge tube is electrically connected to the capacitor. The antenna is structured to emit a signal comprising a series of pulses representative of the intensity of the neutron flux monitored by the self-powered detector. Other core parameters can also be monitored by their effects on altering the values of the inductance and capacitance of the resonant circuit.

Still another in-core sensor that does not require signal leads to communicate its output out of the reactor is disclosed in U.S. Pat. No. 4,943,683, which is incorporated in its entirety herein by reference, which describes an anomaly diagnosis system for a nuclear reactor core having an anomaly detecting unit incorporated into a fuel assembly of the nuclear reactor core, and a transmitter-receiver provided outside the reactor vessel. The transmitter-receiver transmits a signal wirelessly to the anomaly detecting unit and receives an echo signal generated by the anomaly detecting unit wirelessly. When the anomaly detecting unit detects an anomaly in the nuclear reactor core, such as an anomalous temperature rise in the fuel assembly, the mode of the echo signal deviates from a reference signal. Then the transmitter-receiver detects the deviation of the echo signal from the reference signal and gives an anomaly detection signal to a plant protection system. The sensor actually monitors coolant temperature around the fuel assembly in which it is mounted.

Each of the foregoing sensors directly monitor conditions within the core of a nuclear reactor, but none of the sensors directly monitor conditions within a nuclear fuel rod in the core during reactor operation. Before advanced fuel cladding materials can be put into commercial use they have to be rigorously tested to receive regulatory approval. The existing methodology for testing advanced fuel cladding materials requires fuel rods to be tested over several fuel cycles and examined at the end of the irradiation test. This is a lengthy process that takes several years during which time fuel cladding data is not available. In the existing method, critical data is only obtained during the post irradiation examination activities. What is desired is an in-pile sensor that can be placed within a fuel rod, endure the hazardous conditions over several fuel cycles and does not require fuel rod penetrations.

Furthermore, the critical reactor core operating parameters that have to be monitored to ensure that the applicable nuclear fuel rod failure limits are not reached, to assure safe reactor operation, are the maximum measured internal fuel rod temperature ($T_M$) and the peak clad temperature (Tc). In current reactor protection system designs, these values are inferred from fuel fission rate distribution inferences drawn from the above-noted neutron detectors and bulk indications of reactor vessel coolant temperature and coolant flow rate. The lack of detailed fuel rod internal temperature information imposes the need for conservative assumptions on the relationships between the nuclear radiation distribution, reactor vessel temperature distribution, and the corresponding peak $T_M$ and Tc values in the reactor. The assumed conservatisms increase the cost of the electricity produced by the reactor. An in-pile sensor that can be placed within a fuel rod would also minimize the need for such conservatism.

SUMMARY

The disclosed concept achieves the foregoing objectives by providing a method of determining a maximum measured internal fuel rod temperature and a peak clad temperature of one or more of fuel rods in an operating nuclear core comprising the steps of: directly measuring the temperatures at one or more locations within the one or more of the fuel rods; identifying a hottest temperature within the one or more fuel rods as the maximum measured internal fuel rod temperature and a core location where the hottest temperature is measured; measuring the maximum temperature of coolant exiting the core at the core location where the hottest temperature is measured and the minimum flow rate of the coolant; and determining the peak clad temperature from the maximum measured internal fuel rod temperature, the maximum temperature of the coolant exiting the core at the core location where the hottest temperature is measured and the minimum flow rate of the coolant.

In one embodiment the directly measuring step measures the temperature along a plurality of axial locations in the one or more fuel rods. The plurality of axial locations may include the top and bottom of the fuel rods.

In one embodiment, determining the peak clad temperature is based on knowledge of heat transfer and geometric characteristics of fuel pellets in the one or more fuel rods and cladding of the one or more fuel rod. The step of directly measuring the temperature at one or more locations on the fuel may be performed substantially continuously.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
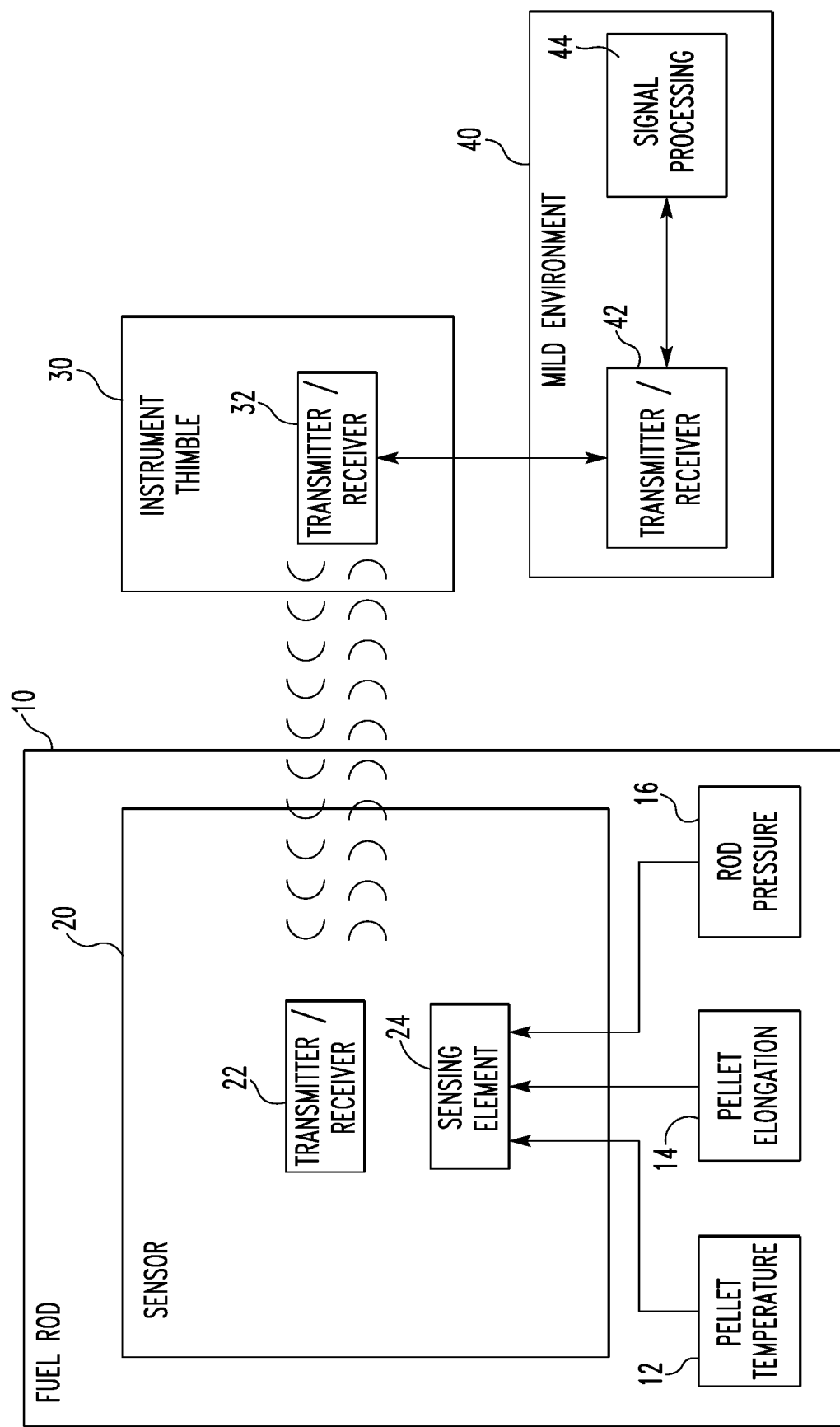
FIG. 1 is a schematic system diagram of a sensor system in accordance with an example embodiment of the disclosed concept.

FIG. 1 is a schematic diagram of a sensor system in accordance with an example embodiment of the disclosed concept. The system includes a sensor 20 disposed in a fuel rod 10 of a nuclear reactor. The sensor 20 includes a transmitting and/or receiving element 22 and a sensing element 24. However, it will be appreciated that the transmitting and/or receiving element 22 may be combined into a single circuit such as is shown and described with respect to FIG. 2. The sensing element 24 is structured to sense one or more characteristics within the fuel rod such as, without limitation, pellet temperature 12, pellet elongation 14, and rod pressure 16. For example, electrical properties of the sensing element 24 are affected based on changes in one or more characteristics within the fuel rod 10. The transmitting and/or receiving element 22 is structured to transmit the sensed information. In some example embodiments, the transmitting and/or receiving element 22 is structured to oscillate at different frequencies based on the sensed characteristics.

The sensor system also includes an instrument thimble 30 including a corresponding transmitting and/or receiving element 32. In some example embodiments of the disclosed concept, the transmitting and/or receiving element 32 in the instrument thimble 30 is structured to interrogate the transmitting and/or receiving element 22 in the sensor 20. For example, the transmitting and/or receiving element 32 in the instrument thimble 30 may interrogate the transmitting and/or receiving element 32 in the sensor 20 by outputting a radio frequency signal and sensing the output of the transmitting and/or receiving element 22 in the sensor 20, similar to the operation of a radio frequency identification (RFID) system. The output of the sensor 20, such as its oscillation frequency, may be indicative of characteristics within the fuel rod 10 such as pellet temperature 12. For example, center-line fuel temperature can be correlated to the inductance change in a resonant circuit of the sensor 20 resulting from a temperature change within the fuel rod 10 and, therefore, the resonant frequency change resulting from the change in inductance, can be detected at the instrument thimble 30.

The sensor system may also include another transmitting and/or receiving element 42 and signal processing elements 44 located in a mild environment 40, such as outside the nuclear reactor core. The equipment located in the mild environment may be structured to receive outputs of the instrument thimble 30, and may be used to process the output of the instrument thimble 30. For example, the signal processing elements 44, may include a processor and/or memory structured to determine temperature characteristics, such as the maximum measured internal fuel rod temperature ($T_M$), based on the output of the instrument thimble 30. The signal processing elements 44 may use $T_M$ to calculate the limiting Peak Clad Temperature (Tc). A Reactor Protection System (RPS) may then use the values of $T_M$ and Tc to determine whether a reactor trip should occur to ensure the required health and safety of the general public is maintained under all operating conditions.

It will be appreciated that any suitable type of sensor may be employed as sensor 20. Some example embodiments of sensors are described herein in connection with FIGS. 2 and 3. However, it will be appreciated that other types of sensors may be employed without departing from the scope of the disclosed concept. In some example embodiments of the disclosed concept, the sensor 20 is passive. However, it will be appreciated that and active sensor (i.e., one that requires a power source) may also be employed without departing from the scope of the disclosed concept.

Figure 2:
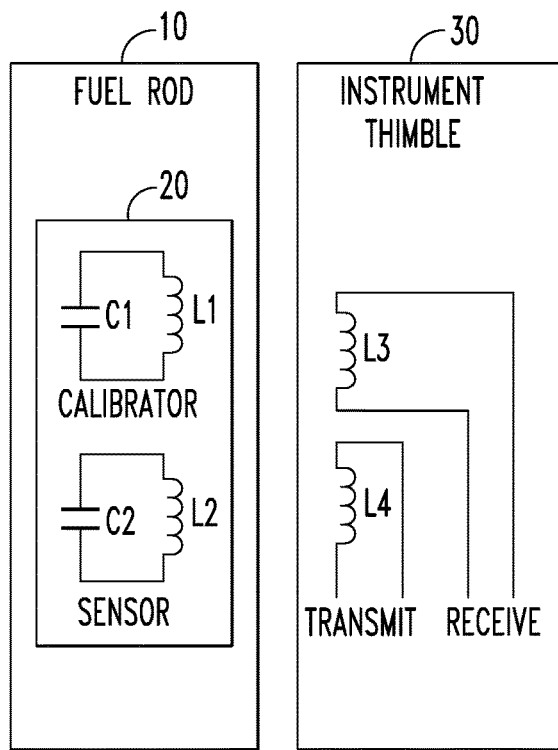
FIG. 2 is a circuit diagram of a sensor system in accordance with an example embodiment of the disclosed concept.
Figure 2:
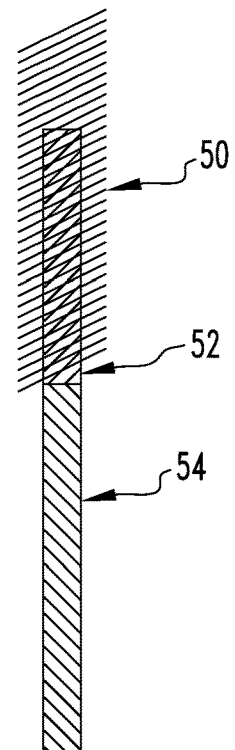

FIG. 2 is a circuit diagram of a sensor system in accordance with an example embodiment of the disclosed concept. In the example embodiment of FIG. 2, the sensor 20 is formed by a resonant circuit. The sensor 20 is structured such that the characteristics of the resonant circuit change based on changes in characteristics within the fuel rod 10 such as temperature. Thus, the output frequency of the sensor 20 will change based on changes in temperature within the fuel rod 10. In some example embodiments, the resonant circuit may include a temperature sensitive electrical component, whose electrical characteristics change based on temperature. For example, inductor L2 or capacitor C2 may be temperature sensitive electrical components. In another example embodiment, a temperature sensitive resistor is added to form an RLC resonant circuit. In another example embodiment, a liquid thermometer is used, which causes inductor L2 to change inductance, which will be described in connection with FIG. 3. The values of the components of the resonant circuit can be chosen so that the return pulse has a unique frequency from which the source of the return pulse can be identified, i.e., the fuel rod from which the return pulse emanated.

The example embodiment shown in FIG. 2 also includes a calibrator, which is another resonant circuit formed by capacitor C1 and inductor L1. The calibrator does not include any temperature sensitive electric components, so its output with remain constant regardless of changes in temperature. This allows the sensor system to calibrate and correct for component degradation and drift. In addition to interrogating the sensor circuit, the instrument thimble 30 will also interrogate the calibrator resonant circuit, which is static. The calibrator circuit response is used to correct any sensor signal change associated with component degradation or temperature drift.

As shown in FIG. 2, the instrument thimble 30 includes a transmitting and receiving component, formed by inductors L3 and L4. The transmitting component may be used to interrogate the sensor 20 and the receiving component may sense the response.

Figure 3:
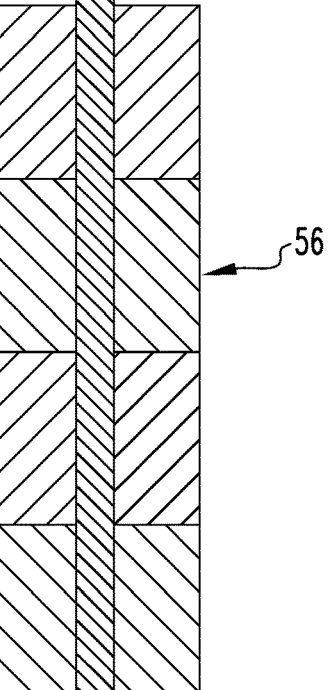
FIG. 3 is a schematic diagram of a sensor using a liquid metal thermometer in accordance with an example embodiment of the disclosed concept.
Figure 1:
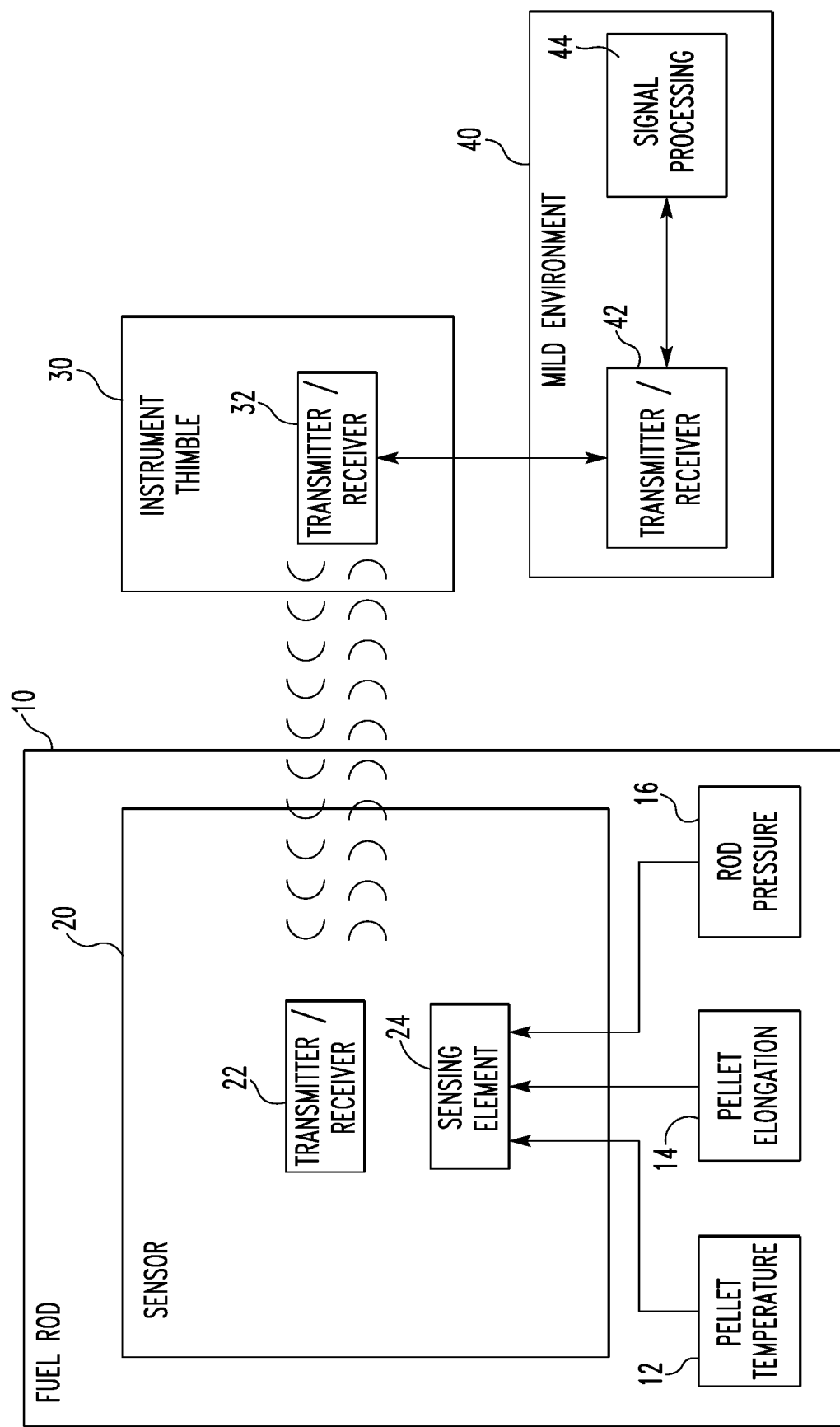
Figure 2:
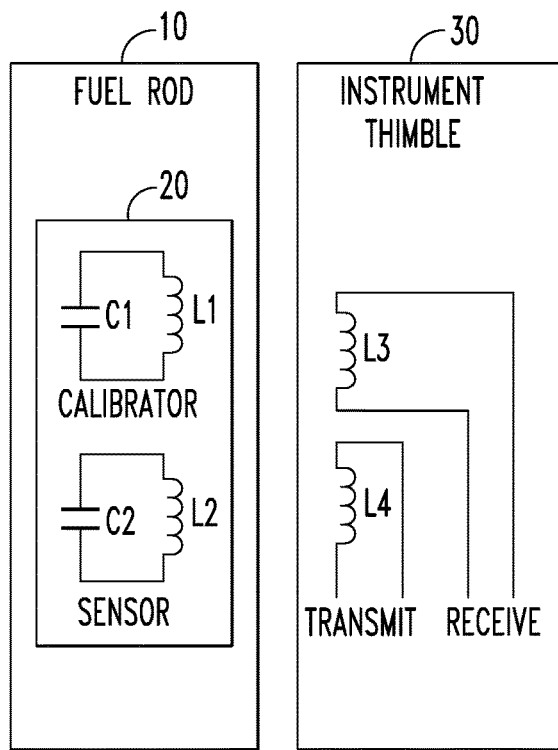
Figure 3:
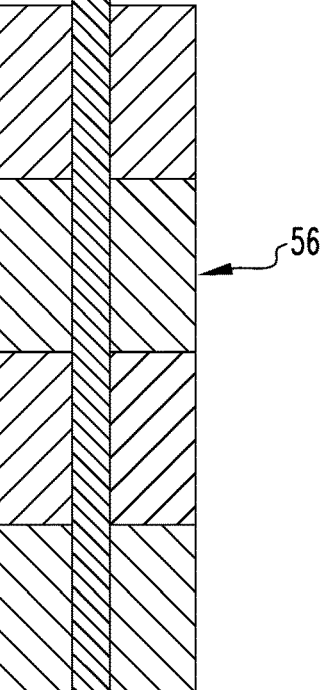
Figure 4:
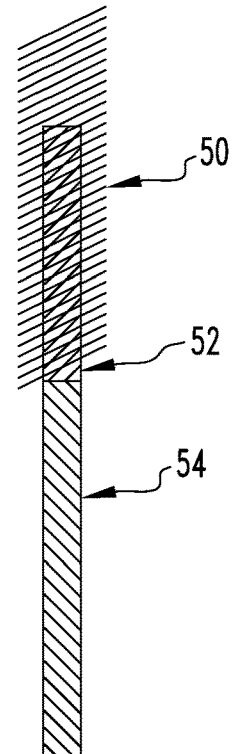

FIG. 3 is a schematic diagram of a sensor employing a liquid metal thermometer in accordance with an example embodiment of the disclosed concept. The sensor includes an inductor coil 50, a ferritic core 52, and a liquid metal thermometer 54. The liquid metal thermometer 54 is placed proximate to fuel pellets 56 in a fuel rod, such as the fuel rod 10 of FIG. 1. The inductance of the inductor coil 50 is dependent on the magnetic permeability of the ferritic core 52 within the coil. If this ferritic core 52 is removed or inserted into the coil 50, the inductance will change relative to its position. Using this methodology, center line temperature within a fuel rod can be measured with the use of the liquid metal thermometer 54. For example, the liquid metal in the liquid metal thermometer 54 with expand and contract with temperature changes within the fuel rod. The ferritic core 52 floats on top of the liquid metal and, thus, the ferritic core 52 will move further into or out of the inductor coil 50 (causing changes in inductance) based on changes in temperature within the fuel rod.

The sensor shown in FIG. 3 may be employed as the sensors 20 shown in FIG. 1 or 2. For example, the inductor coil 50 and ferritic core 52 may form inductor L2 shown in FIG. 2.

The acquired temperature data from the foregoing embodiment may be measured continuously. In principal, the temperature sensors used by the device described above could be placed at multiple axial positions in the fuel rods in the fuel assemblies located in the reactor core. This includes the top and bottom of the fuel rod and could include additional axial positions in the fuel rod. A number of these sensors distributed in the fuel rods expected to have the highest power level in the reactor can be used to determine the most limiting fuel temperature. The fuel rods having the highest power level can be determined from a measure of the core power distribution which is routinely run. When the centerline fuel temperature measurements are used in conjunction with the measured corresponding maximum coolant fluid temperature and minimum coolant flow rate obtained from existing sensors, the value of $T_M$ can be used to calculate the value of Tc. Any suitable existing sensor may be employed to measure the maximum coolant fluid temperature and minimum coolant flow rate. The RPS may then use the values of $T_M$ and Tc to determine whether a reactor trip should occur to ensure the required health and safety of the general public is maintained under all operating conditions.

M. M. El-Wakil, "Nuclear Heat Transport", American Nuclear Society, copyright 1971, Third Printing, Section 5-6, which is incorporated in its entirety herein by reference, provides a description of how the value of Tc can be generated based on knowledge of $T_M$, coupled with the surrounding bulk coolant temperature ($T_F$) and knowledge of the heat transfer characteristics of the fuel pellet and fuel rod structural materials. $T_F$ is determined from the maximum coolant fluid temperature and minimum coolant flow rate. An expression for Tc as a function of time, derived from a corresponding measured $T_M$ and $T_F$, coupled with known heat transfer characteristics of the fuel pellets and fuel rod sheath is:

$$T_C(t) = T_F(t) + \frac{T_M(t) - T_F(t)}{\varphi(t)} \quad \text{Eq. 1}$$

Where:

$$\varphi(t) = \left(\frac{rh}{2k_f(T_F(t))}\frac{A_{r+c}}{A_r} + \frac{ch}{k_c}\frac{A_{r+c}}{A_m} + 1\right) \quad \text{Eq. 2}$$

And:

$$A_m = \frac{2\pi cL}{\ln\left[\frac{r+c}{r}\right]} \quad \text{Eq. 3}$$

Where:
r = fuel pellet diameter
c = cladding thickness
L = fuel rod length
kf = fuel pellet thermal conductivity
kc = cladding thermal conductivity
Ar = cross section area of fuel pellet
Ar + c = cross sectional area of fuel pellet and cladding
h = cladding heat transfer coefficient by convection An additional adjustment to the form of φ(t) to account for the thermal resistivity of a gap between the fuel pellet and cladding may be added by those skilled in the art to account for expected changes in fuel characteristics.

The values of Tc will need to be increased to account for uncertainties associated with the values of the constants, the measured values of $T_F$ and $T_M$, and the expected difference between the limiting value of Tc and the value of Tc determined at the position of the measured value of $T_M$. In the preferred embodiment of this approach, the adjustment to the value of Tc at the position of the measured $T_M$ to obtain a limiting Tc may be determined by those skilled in the art from a continuously measured or predicted axial power distribution (AO) for the instrumented locations. A similar approach is used to adjust the value of the measured $T_M$ values to calculate the value of the peak $T_M$ as a function of time. This can be accomplished by those skilled in the art resulting in an expression for adjusted peak clad temperature of the form:

$$T_M^A(t) = (1+\beta(t))T_M(t)$$

$$T_C^A(t) = (1+\theta(t))T_C(t) \quad \text{Eq. 4}$$

Once the distributions of $T_M^A(t)$ and $T_C^A(t)$ values at a given time are determined from measured or expected reactor power distribution information in the fuel rods expected to have the highest relative power located in the fuel assemblies expected to have the highest relative power, the limiting values of $T_M(t)$ and $T_C^A(t)$ can be determined. A turbine runback and/or reactor trip can be established at a properly conservative setpoint for each parameter.

The foregoing methodology enables the reactor protection system to determine whether to trip the reactor using data more directly aligned with the key parameters of importance in determining whether the fuel rods will experience a Departure from Nucleate Boiling (DNB) or fuel pellet melting. This methodology eliminates the need for complex nuclear power distribution measurement codes and DNB prediction and analysis methods. Furthermore, the foregoing methodology may be used in both existing and future pressurized water reactor, boiling water reactor and light water reactor types. Additionally, the sensors needed for this technique may be integrated into the fuel assemblies.

Figure 4:
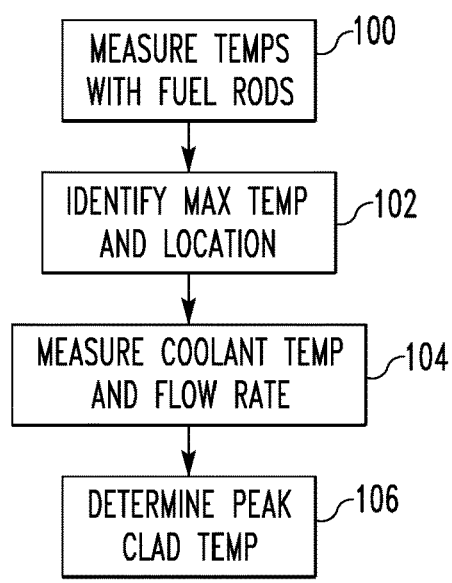
FIG. 4 is a flowchart of a method of determining a maximum measured internal fuel rod temperature and a peak clad temperature of one or more of fuel rods in an operating nuclear core in accordance with an example embodiment of the disclosed concept.

FIG. 4 is a flowchart of a method of determining $T_M$ and Tc in an operating nuclear core in accordance with an example embodiment of the disclosed concept. The method begins at 100 with directly measuring the temperatures at one or more locations on a fuel within the one or more fuel rods of a nuclear reactor. Any suitable sensing system and sensors, such as those described in connection with FIGS. 1-3, may be employed to directly measure the temperature. The method then moves to 102 with identifying a hottest temperature of the fuel and a core location where the hottest temperature is measured. The hottest temperature may be identified based on the outputs of sensors, such as sensor 20, located at various axial positions in fuel rods. The sensor measuring the hottest temperature may be identified, for example, by identification information output by the sensor, and the sensor's location within the core may be identified, for example, by referencing the information on the installation location of the sensor. Next, at 104, the maximum temperature of the coolant exiting the core at the core location corresponding to the hottest temperature and the minimum flow rate of the coolant are measured. These values may be measured using suitable sensors already existing in nuclear reactors. The method proceeds to 106 with determining Tc from the hottest measured temperature of the fuel, the maximum temperature of the coolant exiting the core at the core location and the minimum flow rate of the coolant. For example, Equations 1-3 may be employed to determine Tc. Knowledge of the heat transfer characteristics of the fuel pellet and fuel rod structural materials may also be employed.

The method of FIG. 4 may be implemented in a sensor system such as the sensor system of FIG. 1. For example, step 100 may be implemented with one or more sensors 20. Steps 102-106 may be implemented in a processor, such as signal processing elements 44. The method of FIG. 4 may also include additional steps, such as determining whether $T_M$ and/or Tc exceed threshold levels and, if so, implementing protective measures such as a turbine runback and/or reactor trip, which can be implemented in an RPS.

The systems and method described herein provide improved measurement and calculation of $T_M$ and Tc, while prior systems and methods made more conservative assumptions that limit the operating power levels and power distributions allowed in reactor designs. The systems and methods according to the disclosed concept allow fuel rods to operate much closer to the actual safety limits for fuel pellets and cladding operation, which can improve energy generate for the same amount of fuel by 28%.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of determining a maximum measured internal fuel rod temperature and a peak clad temperature of one or more fuel rods in an operating nuclear core comprising the steps of:

directly measuring the temperatures with sensors at one or more locations within the one or more of the fuel rods, wherein signal processing elements ae structured to receive the measured temperatures from the sensors;

identifying via the signal processing elements a hottest temperature within the one or more fuel rods as the maximum measured internal fuel rod temperature and a core location where the hottest temperature is measured;

measuring the maximum temperature of coolant exiting the core at the core location where the hottest temperature is measured and the minimum flow rate of the coolant; and determining via the signal processing elements the peak clad temperature from the maximum measured internal fuel rod temperature, the maximum temperature of the coolant exiting the core at the core location where the hottest temperature is measured and the minimum flow rate of the coolant.

2. The method of claim 1 wherein the directly measuring step measures the temperature along a plurality of axial locations in the one or more fuel rods.

3. The method of claim 2 wherein in the plurality of axial locations include the tops and bottoms of the one or more fuel rods.

4. The method of claim 1 further comprising:

determining the bulk coolant temperature from the maximum temperature of the coolant exiting the core at the core location where the hottest temperature is measured and the minimum flow rate of the coolant.

5. The method of claim 4, wherein determining the peak clad temperature is based on knowledge of heat transfer and geometric characteristics of fuel pellets in the one or more fuel rods and cladding of the one or more fuel rods.

6. The method of claim 5, wherein determining the peak clad temperature includes determining the peak clad temperature using the following equation:

$$T_C(t) = T_F(t) + \frac{T_M(t) - T_F(t)}{\varphi(t)}$$

Where:

$$\varphi(t) = \left( \frac{rh}{2k_f(T_F(t))} \frac{A_{r+c}}{A_r} + \frac{ch}{k_c} \frac{A_{r+c}}{A_m} + 1 \right)$$

And:

$$A_m = \frac{2\pi cL}{\ln\left(\frac{r+c}{r}\right)}$$

Where:

$r$ = fuel pellet diameter $c$ = cladding thickness $L$ = fuel rod length $k_f$ = fuel pellet thermal conductivity $k_c$ = cladding thermal conductivity $A_r$ = cross sectional area of fuel pellet $A_{r+c}$ = cross sectional area of fuel pellet and padding $h$ = cladding heat transfer coefficient by convection.

7. The method of claim 1 wherein the step of directly measuring the temperature at one or more locations on the fuel is performed substantially continuously.

8. The method of claim 1, further comprising:
comparing the peak clad temperature and/or the maximum measured internal fuel rod temperature with one or more threshold values; and
implementing protective measures in response to determining that the peak clad temperature and/or the maximum measured internal fuel rod temperature with one or more threshold values.

9. The method of claim 8, wherein the protective measured include a turbine runback or a reactor trip.

10. A method for use with an operating nuclear core, the method comprising:
directly measuring temperatures with sensors at one or more locations within one or more of the fuel rods, wherein signal processing elements are structured to receive signals indicative of the temperatures;
identifying via the signal processing elements a hottest temperature within the one or more fuel rods as a maximum measured internal fuel rod temperature and a core location where the hottest temperature is measured;
measuring a maximum temperature of a coolant exiting the core at the core location where the hottest temperature is measured and a minimum flow rate of the coolant; and
determining via the signal processing elements a peak clad temperature from the maximum measured internal fuel rod temperature, the maximum temperature of the coolant exiting the core at the core location where the hottest temperature is measured, and the minimum flow rate of the coolant.

11. The method of claim 10, wherein the one or more locations comprise axial locations in the one or more fuel rods.

12. The method of claim 11, wherein the axial locations include top and bottom locations in the one or more fuel rods.

13. The method of claim 10, further comprising determining a bulk coolant temperature from the maximum temperature of the coolant exiting the core at the core location where the hottest temperature is measured and the minimum flow rate of the coolant.

14. The method of claim 13, wherein determining the peak clad temperature is based on heat transfer and geometric characteristics of fuel pellets in the one or more fuel rods and cladding of the one or more fuel rods.

15. The method of claim 14, wherein determining the peak clad temperature includes determining the peak clad temperature using the following equation:

$$T_C(t) = T_F(t) + \frac{T_M(t) - T_F(t)}{\varphi(t)}$$

Where:

$$\varphi(t) = \left( \frac{rh}{2k_f(T_F(t))} \frac{A_{r+c}}{A_r} + \frac{ch}{k_c} \frac{A_{r+c}}{A_m} + 1 \right)$$

And:

$$A_m = \frac{2\pi cL}{\ln\left(\frac{r+c}{r}\right)}$$

Where:

$r$ = fuel pellet diameter $c$ = cladding thickness

-continued $L$ = fuel rod length $k_f$ = fuel pellet thermal conductivity $k_c$ = cladding thermal conductivity $A_r$ = cross sectional area of fuel pellet $A_{r+c}$ = cross sectional area of fuel pellet and padding $h$ = cladding heat transfer coefficient by convection.

16. The method of claim 10, further comprising comparing the peak clad temperature and/or the maximum measured internal fuel rod temperature with one or more threshold values.

17. The method of claim 16, further comprising implementing protective measures based on results of the comparing of the peak clad temperature and/or the maximum measured internal fuel rod temperature with the one or more threshold values.

18. A method for use with an operating nuclear core, the method comprising:
receiving signals indicative of temperatures detected by sensors at one or more locations within one or more fuel rods of the operating nuclear core;
based on the signals, identifying a hottest temperature within the one or more fuel rods as a maximum measured internal fuel rod temperature and a core location where the hottest temperature is identified;
determining a maximum temperature of a coolant exiting the core at the core location where the hottest temperature is measured and a minimum flow rate of the coolant; and
determining via signal processing elements a peak clad temperature based on the maximum measured internal fuel rod temperature, the maximum temperature of the coolant exiting the core at the core location where the hottest temperature is identified, and the minimum flow rate of the coolant.

19. The method of claim 18, wherein the one or more locations comprise axial locations in the one or more fuel rods.

20. The method of claim 19, wherein the axial locations include top and bottom locations in the one or more fuel rods.

21. The method of claim 18, further comprising determining a bulk coolant temperature from the maximum temperature of the coolant exiting the core at the core location where the hottest temperature is identified and from the minimum flow rate of the coolant.

22. The method of claim 21, wherein determining the peak clad temperature is based on heat transfer and geometric characteristics of fuel pellets in the one or more fuel rods and cladding of the one or more fuel rods.

23. The method of claim 22, wherein determining the peak clad temperature includes determining the peak clad temperature using the following equation:

$$T_C(t) = T_F(t) + \frac{T_M(t) - T_F(t)}{\varphi(t)}$$

Where:

$$\varphi(t) = \left( \frac{rh}{2k_f(T_F(t))} \frac{A_{r+c}}{A_r} + \frac{ch}{k_c} \frac{A_{r+c}}{A_m} + 1 \right)$$

-continued

And:

$$A_m = \frac{2\pi cL}{\ln\left(\frac{r+c}{r}\right)}$$

Where:

$r$ = fuel pellet diameter $c$ = cladding thickness $L$ = fuel rod length $k_f$ = fuel pellet thermal conductivity $k_c$ = cladding thermal conductivity $A_r$ = cross sectional area of fuel pellet $A_{r+c}$ = cross sectional area of fuel pellet and padding $h$ = cladding heat transfer coefficient by convection.

24. The method of claim 18, wherein the temperatures are continuously detected.

25. The method of claim 18, further comprising comparing the peak clad temperature and/or the maximum measured internal fuel rod temperature with one or more threshold values.

26. The method of claim 25, further comprising implementing protective measures based on results of the comparing of the peak clad temperature and/or the maximum measured internal fuel rod temperature with the one or more threshold values.

\* \* \* \* \*